United States Patent [19]

Anderson et al.

[11] Patent Number: 5,088,272

[45] Date of Patent: * Feb. 18, 1992

[54] ATTACHABLE GUIDE RING FOR DOG HEAD COLLARS

[75] Inventors: Robert K. Anderson, Roseville; Ruth E. Foster, Minneapolis, both of Minn.

[73] Assignee: Regents of the University of Minnesota, Minneapolis, Minn.

[*] Notice: The portion of the term of this patent subsequent to Jul. 17, 2007 has been disclaimed.

[21] Appl. No.: 464,184

[22] Filed: Jan. 12, 1990

Related U.S. Application Data

[63] Continuation-in-part of Ser. No. 365,932, Jun. 12, 1989, abandoned, which is a continuation of Ser. No. 169,294, Mar. 17, 1988, Pat. No. 4,838,206, which is a continuation of Ser. No. 922,156, Oct. 23, 1986, Pat. No. 4,741,288, which is a continuation-in-part of Ser. No. 719,697, Apr. 4, 1985, Pat. No. 4,621,591.

[51] Int. Cl.$^5$ .................................. B68B 1/02
[52] U.S. Cl. .......................................... 54/24
[58] Field of Search .............. 119/106, 130; 54/6, 54/15, 24

[56] References Cited

U.S. PATENT DOCUMENTS

| 1,232,308 | 7/1917 | Higgins | 54/24 |
| 1,536,507 | 5/1925 | Lawson | 54/24 |
| 2,625,780 | 1/1953 | Flatt | 54/6 |
| 2,821,034 | 1/1958 | Baker | 119/106 |
| 3,528,215 | 9/1970 | Johnson | 54/24 |
| 4,094,131 | 6/1978 | McElvey | 54/24 |
| 4,566,255 | 1/1986 | DeGroot | 54/24 |
| 4,838,206 | 6/1989 | Anderson et al. | 119/130 |
| 4,841,915 | 6/1989 | Rocchetti | 119/106 |
| 4,941,313 | 7/1990 | Anderson et al. | 54/24 |

FOREIGN PATENT DOCUMENTS 72269 8/1916 Austria .

Primary Examiner—Gene Mancene
Assistant Examiner—Thomas Price
Attorney, Agent, or Firm—Kinney & Lange

[57] ABSTRACT

A combination collar and muzzle is used as a humane method of restraining, controlling, and achieving obedient behavior of animals, dogs in particular. A collar member or loop encircles the neck immediately behind the ears, and a second muzzle loop encircles the upper and lower jaws of the animal to form a type of a figure eight combination collar and muzzle. The two loops are coupled together with a ring that is separately attachable to a continuous collar on the dog.

8 Claims, 4 Drawing Sheets

ATTACHABLE GUIDE RING FOR DOG HEAD COLLARS

CROSS-REFERENCE TO RELATED APPLICATION

This application is a continuation-in-part of our co-pending U.S. patent application Ser. No. 07/365,932, filed June 12, 1989 now abandon, which is a continuation of our patent application Ser. No. 169,294, filed Mar. 17, 1988, now U.S. Pat. No. 4,838,206, which is a continuation of our application Ser. No. 922,156, filed Oct. 23, 1986, now U.S. Pat. No. 4,741,288, which in turn is a continuation-in-part of our application Ser. No. 719,697, filed Apr. 4, 1985, now U.S. Pat. No. 4,621,591.

BACKGROUND OF THE INVENTION

The present invention relates to training aids used for controlling and achieving obedient behavior of dogs in particular.

In the prior art various types of muzzles and collars have been used in attempts to achieve dog control, including a metal choke chain collar which encircles the neck and tightens down to tend to choke the dog as control pressure is applied through a leash.

Additionally, there are prong collars that have metal prongs or points that press against the skin of the neck producing pain at the pressure points, which can cause injury as well as great pain. Snap around choke collars have been used to fit around the neck, but, again, these do not control the muzzle and can produce injury to the trachea and/or larynx. There are traditional muzzles to encase the nose and lower jaw of a dog but they do not apply any variable pressure and merely keep the mouth from being opened sufficiently to prevent dogs from biting people.

The prior art includes a device called a "K-9 Kumalong Halter". This device is shown in U.S. Pat. Nos. 4,483,275 and 4,566,255 issued to Alice A. De Groot. The halter has an integral leash on a muzzle loop which will tend to tighten upon pulling on the leash, but the way the device is constructed the neck band does not apply appropriate pressure to the sensitive areas of the neck that achieve dog control and obedience without injuring the dog.

The products shown in our U.S. Pat. No. 4,838,206 have been in public use for more than a year prior to this application and published since May of 1988. Two of the inventors of the prior patent listed above are the inventors of the present improvements. The present invention includes improvements over the prior patents listed above to increase adaptability in use.

SUMMARY OF THE INVENTION

The present invention relates to a combination collar and muzzle that achieves obedient and companionable behavior of dogs as well as other animals by providing two loops (a collar loop and a muzzle loop) which when assembled will be simultaneously tightened down onto the back and sides of the neck of the dog and onto the front of the muzzle through a slip connection that provides direct control of variable pressure through a leash held by the animal handler. The two loops are held together with a guide ring that can be attached onto a continuous neck collar, which can be a standard collar. The guide ring is positioned under and near the rear of the lower jaw. The loops are slidably connected through a provided portion of the guide ring so that direct pressure is applied from the leash directly to the muzzle loop against the front of the muzzle, and at the same time the positioning of the collar or neck loop insures that direct pressure is simultaneously applied to the dog's neck, immediately behind its ears, to obtain control and obedience.

The muzzle loop can be in size if desired, using an adjustable slide below the guide ring as shown in U.S. patent application Ser. No. 07/223,157, filed Jul. 22, 1988.

The muzzle loop and collar loop preferably are made of materials that do not injure the skin. guide ring and muzzle loop are quickly and easily applied to a standard neck collar. This makes a kit provides for a detachable leash so that the dog can be permitted to run free for obedience exercises, and immediately be recontrolled by attaching the leash and operating the collar and muzzle.

DETAILED DESCRIPTION OF THE PREFERRED EMBODIMENTS

Figure 1:
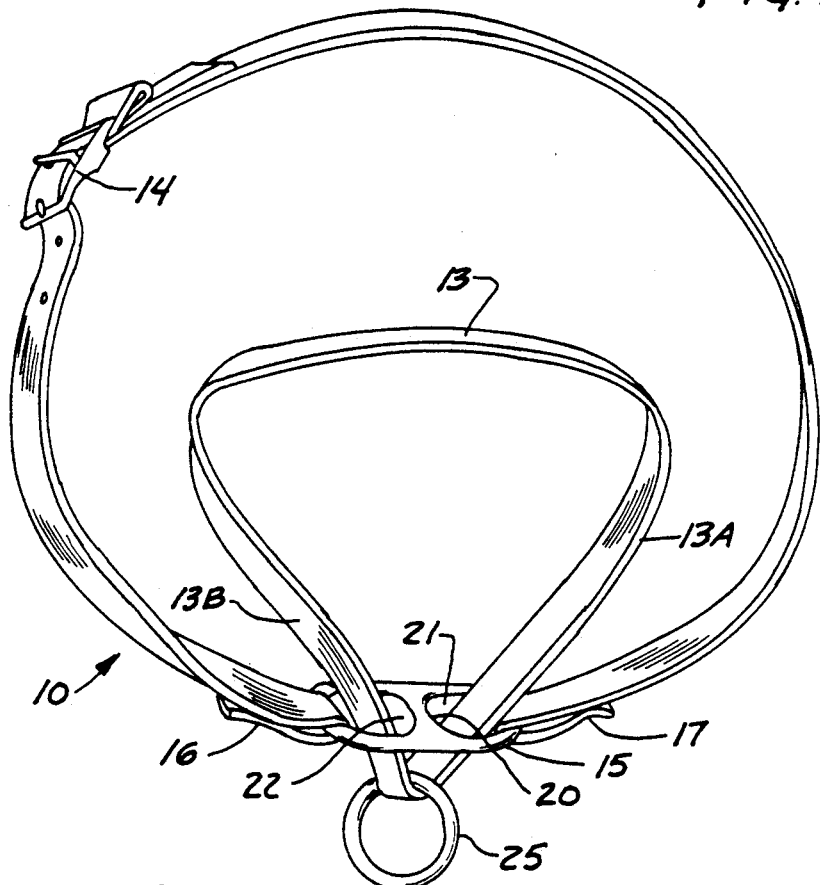
FIG. 1 is a front perspective view of a combination collar and muzzle training aid illustrating individual parts.
Figure 2:
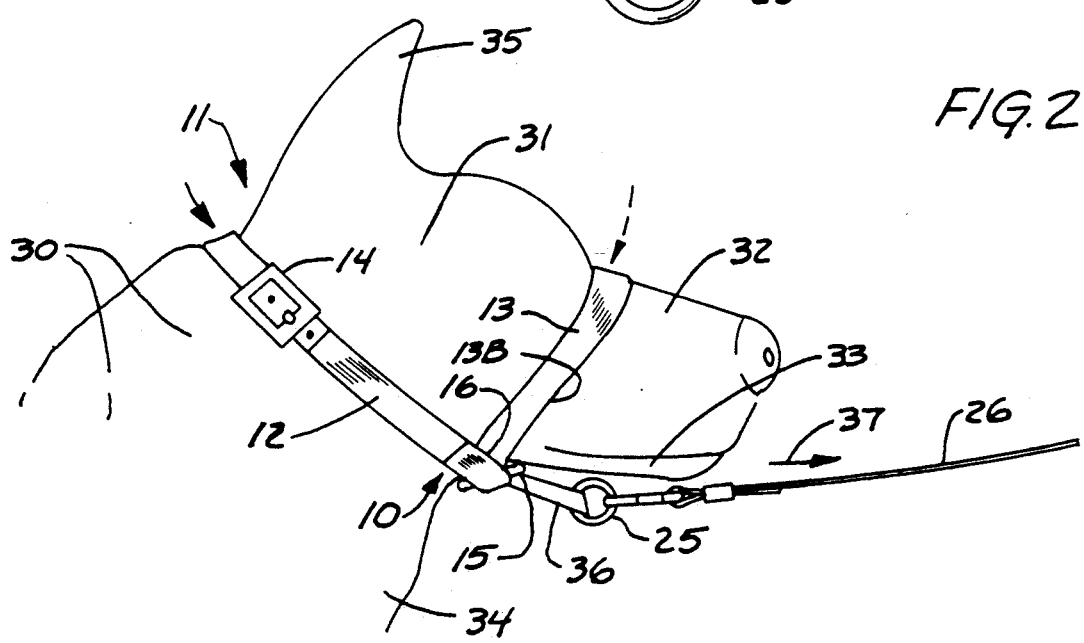
FIG. 2 is a side view of the combination collar and muzzle training aid of FIG. 1 shown on the head view of a dog.

As shown in FIGS. 1 and 2, a combination collar and muzzle training aid is illustrated generally at 10, and in FIG. 2 it is mounted onto the head and neck of a dog indicated at II. The combination collar and muzzle training aid includes a collar or neck loop 12 and a muzzle loop 13. An adjustable fastener 14 (such as a buckle) is used with the collar loop, so that the size of the collar loop can be adjusted to snugly fit the neck of the dog. A connecting ring indicated generally at 15 is attached to the collar loop. As shown, the connecting ring 15 is integrally fastened to and forms part of the collar loop. The ring 15 is connected to ends of sections of the flexible collar band as shown at 16 and 17, on opposite sides of the ring 15. The ring 15 is an oval ring that has a central divider bar 20 to form two side openings 21 and 22. The two lengths indicated at 13A and 13B of the muzzle loop 13 pass through the openings 21 and 22 on opposite sides of the center bar 20, respectively, and the lengths of the muzzle loop are freely slidable in the two side openings of ring 15. A snap receiving ring shown at 25 is also slidably mounted on the muzzle loop 13, below ring 15 for attachment of a leash 26 shown in FIG. 2. The ring 25 slides freely for self adjustment when the leash is pulled.

The dog 11, as shown, has a neck 30, a head 31, a muzzle 32, a lower jaw 33, and a throat 34.

In installation the collar loop 12 is placed around the neck 30 of the dog and adjusted with the buckle or adjustable fastener 14. Preferably the collar loop and the muzzle loop are made of a strong Nylon web material, but can be made of other flexible materials that can be adjusted in length. The collar loop 12 is made to fit snugly around the throat, but not sufficiently tight to cause choking. The collar loop is placed just behind the ears 35 of the dog and extends behind the head and jaw. The ring is, as can be seen is under the neck at the rear end of the dog's lower jaw. In FIG. 2 the leash is under tension and the collar loop and muzzle loop are tightened down.

On a dog, as shown in FIG. 2, there is a natural recess between the neck and the rear of the lower jaw for positioning of the collar loop 12. The muzzle loop 13 is looped over the muzzle 32 of the dog. The lower portion of the muzzle loop indicated at 36, which extends below the ring 15, carries the leash ring 25 on the outside of the ring 15, but the side lengths 13A and 13B (13B is shown in FIG. 2) are freely slidably passed through the openings 21 and 22. As can be seen in FIG. 2 as soon as pressure is applied to the lower portion 36 of the muzzle loop by pulling on the leash, for example, forwardly as shown by arrow 37, the muzzle loop will exert a force against the upper surfaces of the muzzle and ring 15 will move against the lower jaw. When forces are applied in the direction shown in FIG. 2 generally along the leash there will also be a simultaneous force created by the sliding of the collar loop 12 against the neck on the upper portions of the neck as the ring 15 is pulled by the leash. There thus is pressure on the two most important animal control pressure points, namely the muzzle and the top of the neck immediately behind the ears where nerves and muscles are located.

One of the features is that the pressure to the muscles and nerves takes advantage of the generally accepted theory that comes from research on horses (which provides indirect evidence of similar neurophysiologic effects in dogs) that the pressure on the nerves and tissues causes release of neurotransmitters which appear to have a palliative or calming effect. The calming effect aids in humane control without injury to tissues, nerves or organs of the animal when properly applied.

The collar has a very simple geometric form as shown in FIG. 1, such as a "FIG. 8" when the two loops are laid out. The loops are slidably joined in the center and with the muzzle loop freely slidable in the oval, center bar ring 15 held by the collar loop. By the application of pressure on the leash in substantially any direction, pressure is simultaneously applied in areas that provide effective control, which from indirect evidence is believed to be related to neurophysiologic action and the release of palliative and calming neurotransmitters.

Figure 3:
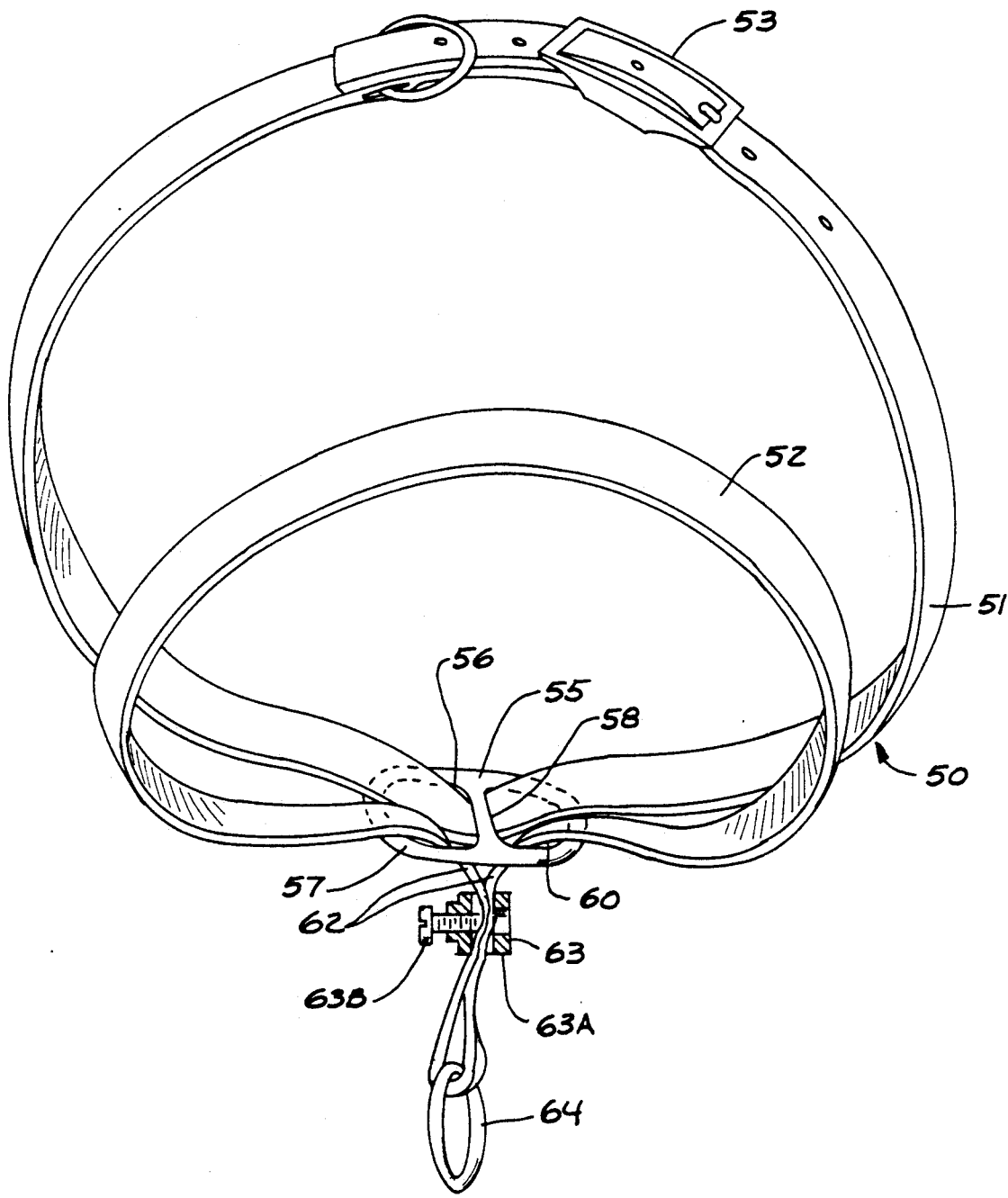
FIG. 3 is a front perspective of a form of the combination collar and muzzle having a ring attachable to a standard collar for holding the muzzle loop of the present invention.

FIG. 3 illustrates a form of the invention that shows a slide ring for the muzzle loop, where a separable ring is slid onto a separate collar, and the muzzle loop passes through the same ring. This type of device is adaptable for use on existing dog collars to form a combination collar and muzzle training aid, shown at 50. The training aid includes a collar or neck loop 51 and a muzzle loop 52. An adjustable buckle fastener 53 is provided on the collar loop. The collar loop is a conventional collar that is continuous, and in this form of the invention, a slide-guide ring indicated generally at 55 is utilized.

Ring 55 is not fastened to sections of the collar, but rather the collar loop or strap 51 is passed through a first opening 56 formed by an outer rim 57, and is looped over a cross bar 58, and then passed through a second opening 60 formed by the rim 57 and the cross bar 58. The ring 55 is thus secured to the collar by a first portion of the divider bar in the ring. The first portion of the divided bar ring is essentially the rear two-thirds of the openings 56 and 60, and the front two-thirds of the openings 56 and 60, comprises a second portion of the area circumscribed by the rim 57.

The muzzle loop 52 has strap lengths 62 passing through the openings 56 and 60 to a position below the ring 55. As shown, the strap forming the muzzle loop 52 has a sliding lock member 63 that permits adjusting the size of the muzzle loop 52 to fit different size dogs. The lock member has a housing 63A with a slot to receive the strap lengths 62. The housing slides along the strap sections below ring 55 until the muzzle loop is the correct size and then is locked in place using a screw 63B that tightens down to clamp the strap section 62 in place. The screw forces the strap sections partially into the hole on the opposite side of the housing 63A from the screw 63B.

A leash attachment ring 64 thereon is used on the muzzle loop below the slide-guide ring 55 and the lock member 63. The muzzle loop 52 is smooth and continuous across the top of the muzzle of the animal and can be adjusted for proper fit. The slide-guide ring 55 is positioned immediately behind the jaw, and under the throat as shown in FIG. 2. The ring 55 can be placed onto an existing collar for quickly mounting the muzzle loop in place and providing an assembly that has the advantages outlined for the training aid.

Figure 4:
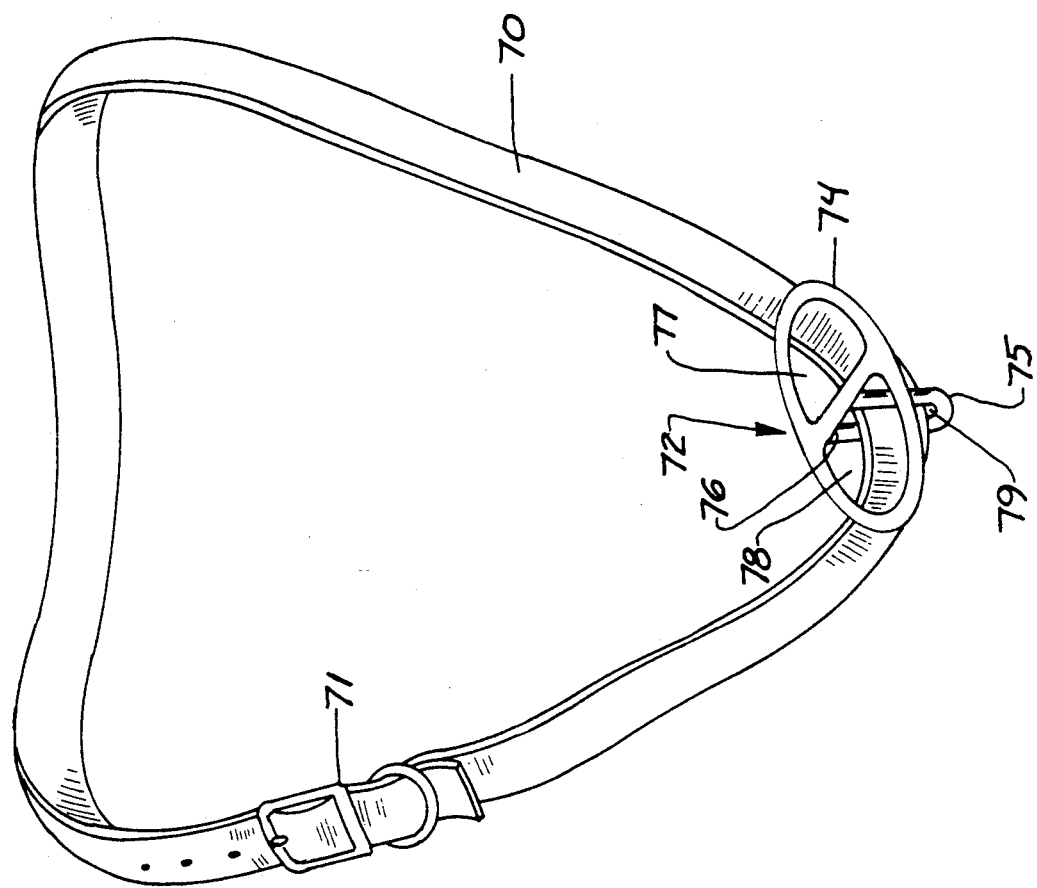
FIG. 4 is a perspective of a form of the combination collar and muzzle training aid having a separable ring for holding the muzzle loop of the present invention shown on a standard collar.
Figure 5:
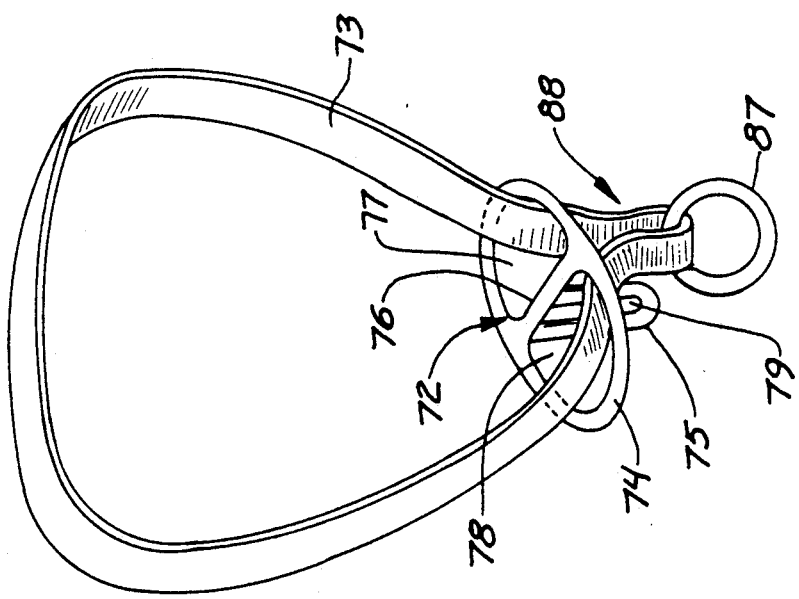
FIG. 5 is a front perspective view of the ring of FIG. 4 removed from the collar and showing a muzzle loop in place.
Figure 6:
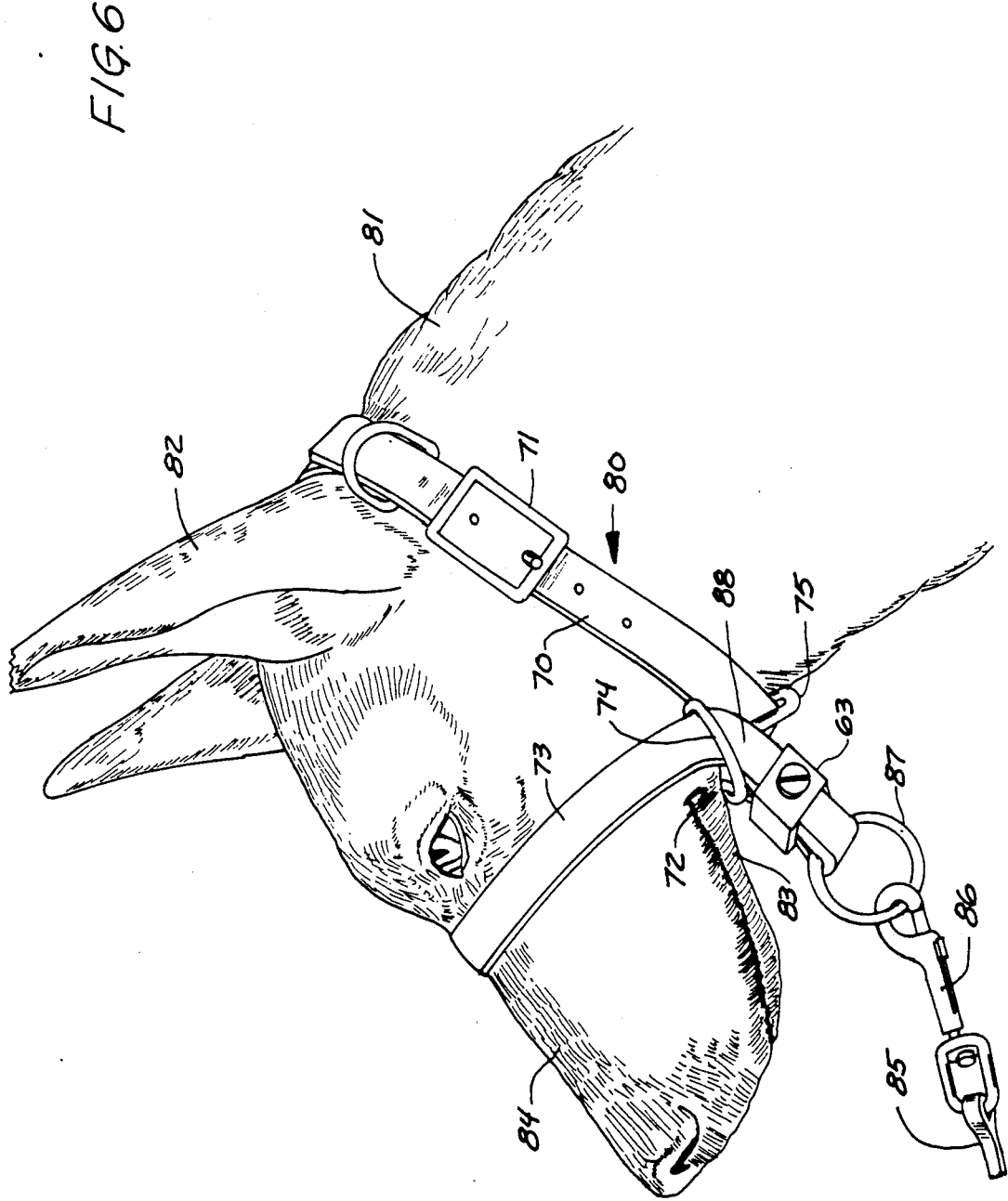
FIG. 6 is a perspective view of a combination collar and muzzle training aid using a removable guide ring as shown in FIG. 4 and in place on the head of a dog.

FIGS. 4, 5 and 6 show a modified form of the present invention which includes a continuous collar 70 with an adjustable buckle 71 so that it can be made to fit snugly around a dog's neck and encircle the neck to immediately rearwardly of the jaw. In this form of the invention, a removable slide-guide ring indicated generally at 72 is used for holding a muzzle loop at 73 (FIG. 5). The slide-guide ring 72 has a rim member 74 that defines a periphery, and it has an attachment means 75 fixed to the rim member. The attachment means is a clip that receives the collar to a cross divider bar 76 that divides the main rim member portion or section 74 into two apertures. The apertures are indicated at 77 and 78, respectively. The clip member 75 defines a third aperture 79 through which the collar passes, and it can be seen that the plane of the slide-guide ring 74 is at right angles to the plane of the clip member 75 that defines the aperture 79. The rim 74 will tend to rest snugly against the lower side of the dog's throat immediately to the rear of the jaw (see FIG. 5). The muzzle loop 73 is passed through the two apertures 77 and 78, as shown, and freely slides through the apertures 77 and 78, which are formed by the rim 74 and divider bar 76 to permit exerting the control pressure on the muzzle, simultaneously with the control pressure along the neck and immediately behind the ears of the dog wearing the training aid.

Of course, various clip attachment sections or members 75 can be made, including quick hook type clips, or differently shaped loops, but in this form of the invention a separate closed loop is formed on the slide-guide ring to permit attaching to the collar 70, which can be a standard collar.

The training aid is shown at 80 in FIG. 6, on the neck of a dog 81, and as can be seen the collar 70 is adjusted with the buckle or adjustment device 71A to fit snugly around the neck of a dog immediately behind the ears 82 and under the throat immediately to the rear of the lower jaw 83 of the dog. The muzzle loop 73 passes over the muzzle 84 just ahead of the dog's eyes, as shown in FIG. 6. It can be adjusted in size using a slide lock device 63A as shown in FIG. 3. The slide lock device 63A is below the rim 74. A leash 85 can be fastened with a snap 86 to a ring 87 that is attached to the muzzle loop 73, on the portion of the muzzle loop indicated at 88 that is below the rim 74 and the lock device 63.

It can be seen that the clip member 75 is generally flat against the throat of the dog, and this places the plane of the rim 74, and the second section of the guide ring just to the rear of the lower jaw in the natural hollow formed. This permits the controlling action of simultaneous pressure on both the muzzle and the neck for the calming action that has been previously explained.

The humane aspects of the present training aid have been demonstrated in use, and the advantages of the recognized neurophysiologic action, as well as the anatomic action on the neck provide for adequate control. Neurotransmitters to the brain are affected, as shown by indirect evidence with other animals, for calming and control in a humane manner.

Thus, in summary, the device of the present invention in all its forms provides direct control of variable pressure that is applied simultaneously to the back and sides of the neck and the upper and lower jaws, without applying choking pressure to the sensitive areas under the neck, such as the trachea and larynx, when the leash is tightened. The muzzle loop is of size to permit the dog to pant when the muzzle loop is loose, but the muzzle loop can quickly be tightened to prevent a dog from biting when leash pressure is applied. The simultaneous pressure applied to the collar and the muzzle insures that the dog's jaws can be kept tightly closed if desired. The training aid provides more humane, but precise and effective restraint to aid control and achieve obedient behavior of any dog, regardless of size, temperament or initial behavior.

When a handler pulls appropriately on the leash, pressure is provided to the desired area of muscles and nerves at the back of the neck, immediately behind the ears, and to the sides of the neck and is actively controlled to give a neurophysiologic action as explained, tending to provide calming neurotransmitters to the brain for control. The action is not mechanical as with other collars. The pressure to these anatomical areas of the neck behind the ears is easily controlled and there is no excessive force required to tend to injure the skin or organs of the dog. The keeper straps insure retaining the muzzle loop on the dog's muzzle. The adjustable muzzle loop provides a fit for dogs of different sizes.

The humane control is provided precisely and effectively by the amount of pressure applied by pulling the leash in any direction to achieve obedient behavior of any dog, large or small and regardless of temperament, that is, whether or not the dog is vicious, rambunctious, boisterous, assertive, reluctant or fearful.

Many kinds of materials, such as leather, as well as nylon strapping, plastic, flexible metal and other suitable materials can be utilized for the figure eight design of the combination collar and muzzle loop and for the keeper straps.

Although the present invention has been described with reference to preferred embodiments, workers skilled in the art will recognize that changes may be made in form and detail without departing from the spirit and scope of the invention.

What is claimed is:

1. A humane training aid for dogs having a head with a muzzle, a neck and ears, the training aid being for use in combination with a collar adapted to fit closely around the neck of a dog on which the humane training aid is placed and the collar fitting across an upper side of the neck immediately behind the ears of such dog and extending closely behind the head along laterally sides of the neck to a lower side of the neck, and a muzzle loop that fits over the muzzle of such dog, wherein the improvement comprises a slide-guide ring for slidably receiving the muzzle loop and for supporting the muzzle loop relative to the collar, said slide-guide ring having a portion which receives the collar and slides thereon, and a second portion which receives the muzzle loop and permits free sliding movement of the muzzle loop relative to the slide-guide ring and the collar, the muzzle loop having a portion extending out of the ring for attachment to a leash, the first and second portions of said slide-guide ring being supported on the collar so that when the muzzle loop is pulled, pressure is applied downwardly on the muzzle of a dog by the muzzle loop sliding through the slide ring and applying pressure to the collar so the collar substantially continuously bears on the upper side and the lateral sides of the neck of a dog wearing the humane training aid while pressure is applied by a leash on the muzzle loop.

2. The training aid of claim 1 wherein said slide-guide ring comprises a ring that has a peripheral rim defining an opening for receiving the muzzle loop, and a separate attachment means for connecting to a collar on a dog.

3. The training aid of claim 2 wherein said ring comprises a rim member defining a continuous ring, and a divider member therethrough, said muzzle loop having strap portions that pass on either side of the divider ring within the continuous ring, and said collar passing in one side of the divider ring, and across the divider and out through a second portion of the ring.

4. A slide guide ring for attachment to a collar which encircles the neck of a dog, and for supporting a control muzzle loop that passes over the muzzle, said slide guide ring having two portions, a first portion receiving the collar, the slide guide ring being slidably mounted to the collar for positioning beneath the throat of a dog wearing the collar, and a second portion which receives a muzzle loop and permits free sliding movement of the muzzle loop relative to the slide guide ring and the collar, the muzzle loop having a portion extending out of the ring for attachment to a leash, the first and second portions of said slide guide ring being supported on the collar so that when the muzzle loop is pulled, pressure is applied downwardly on the muzzle of a dog wearing the collar by the muzzle loop sliding through the slide ring and applying pressure to the collar, so that the collar substantially continuously bears on the upper side and the lateral sides of the neck of a dog wearing the collar and muzzle loop while pressure is applied by a leash on the muzzle loop.

5. The guide ring of claim 4 wherein said ring first portion is removably received on a separate collar.

6. The guide ring of claim 4 wherein said first enclose ring portion comprises a first ring for slidably mounting on a dog collar, and said second ring portion comprises a second enclosed ring portion for receiving the muzzle loop.

7. The guide ring of claim 4 wherein said guide ring has a divider bar across center portions thereof, said divider bar dividing the ring into two openings, respectively, and wherein one length of said collar and one length of said muzzle loop are positioned through each opening.

8. The slide guide ring of claim 4 wherein said first and second portions define separate continuous rings, and said second portion has a divider bar to divide the continuous ring into two separated openings, each opening receiving a strap length of the muzzle loop.

* * * * *

UNITED STATES PATENT AND TRADEMARK OFFICE
CERTIFICATE OF CORRECTION

PATENT NO. : 5,088,272

DATED : February 18, 1992

INVENTOR(S) : Robert K. Anderson, Ruth E. Foster

It is certified that error appears in the above-identified patent and that said Letters Patent is hereby corrected as shown below:

Col. 6, line 66, delete "enclose", insert "enclosed".

Signed and Sealed this

Fourth Day of May, 1993

Attest:

MICHAEL K. KIRK

Attesting Officer

Acting Commissioner of Patents and Trademarks